(12) United States Patent
Vian

(10) Patent No.: US 6,231,074 B1
(45) Date of Patent: *May 15, 2001

(54) STEERING WHEEL

(75) Inventor: Paolo Vian, Tregnago (IT)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/281,441

(22) Filed: Mar. 29, 1999

(30) Foreign Application Priority Data

May 22, 1998 (IT) ............................................. MI98U0369

(51) Int. Cl.$^7$ ................................................. B60R 21/16
(52) U.S. Cl. ......................... 280/731; 280/728.2; 74/552
(58) Field of Search ............................... 280/731, 728.2, 280/750; 74/552

(56) References Cited

U.S. PATENT DOCUMENTS

| | | | |
|---|---|---|---|
| 3,819,205 | * 6/1974 | Dunford et al. | 280/731 |
| 4,644,817 | * 2/1987 | Albrecht et al. | 74/552 |
| 5,267,486 | * 12/1993 | Niwa et al. | 74/552 |
| 5,356,173 | * 10/1994 | Hongou et al. | 280/728.2 |
| 5,431,438 | * 7/1995 | Manabe | 280/731 |
| 5,810,391 | * 9/1998 | Werner et al. | 280/731 |
| 5,921,146 | 7/1999 | Cattaneo | 74/552 |
| 6,164,690 | * 12/2000 | Vian | 280/731 |

* cited by examiner

Primary Examiner—Robert P. Olszewski
Assistant Examiner—Lynda Jasmin
(74) Attorney, Agent, or Firm—Lonnie Drayer

(57) ABSTRACT

A steering wheel is provided with an airbag. The steering wheel has a central part for connection to a steering wheel attachment, having a cavity for housing a module comprising the airbag safety device and a horn, an outer ring and a plurality of substantially radial spokes connecting the outer ring to the central part of the steering wheel. Around module there is provided a metal peripheral part fixed to the plurality of spokes by means of connecting means so as to give the steering wheel a sporting appearance.

6 Claims, 2 Drawing Sheets

STEERING WHEEL

FIELD OF THE INVENTION

This invention relates to a motor vehicle steering wheel of sporting appearance equipped with an airbag.

BACKGROUND OF THE INVENTION

The use of airbags for protecting motor vehicle drivers in the event of a crash is now widespread.

The increasing use of airbags has created a problem for steering wheel manufacturers, in particular with those intended for sporting vehicles, because the inclusion of airbags in steering wheels has caused the steering wheels to lose their sporting appearance and the customers for these vehicles are not pleased with this.

SUMMARY OF THE INVENTION

It is an object of this invention is to provide a steering wheel of sporting appearance with an airbag.

According to this invention this object is achieved through a steering wheel provided with an airbag comprising a central part for connection to a steering wheel attachment, having a cavity housing a module comprising the airbag safety device and a horn, an outer ring and a plurality of substantially radial spokes connecting the outer ring to the central part of the steering wheel, characterized in that it comprises a peripheral metal part around the module fixed to the plurality of spokes by means of connecting means so as to give the steering wheel a sporting appearance.

BRIEF DESCRIPTION OF THE DRAWINGS

The characteristics of this invention will be obvious from the following detailed description of an embodiment and its variant illustrated by way of nonlimiting examples in the appended drawings, in which.

DETAILED DESCRIPTION OF THE INVENTION

Figure 1:
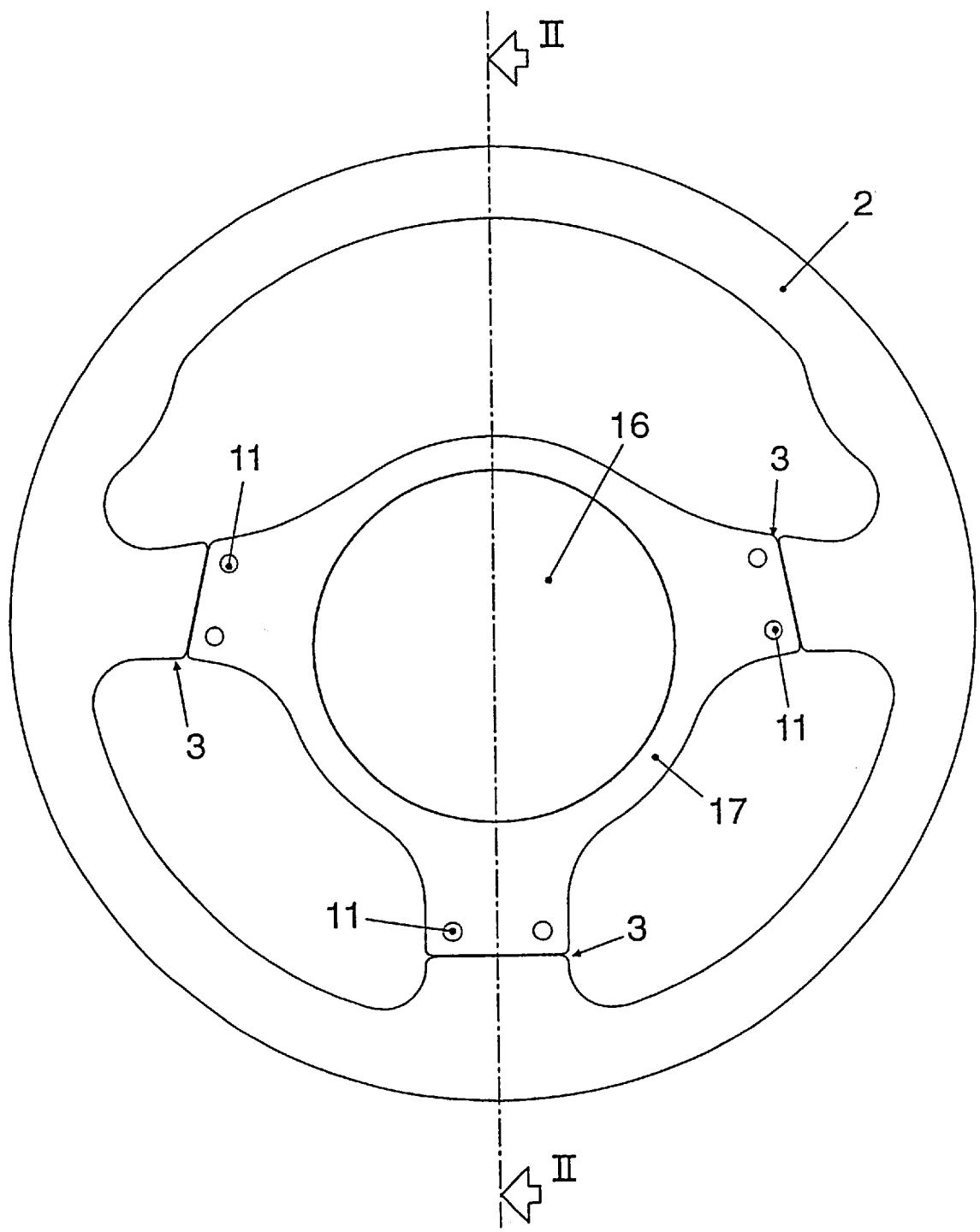
FIG. 1 shows the steering wheel according to the invention in plan from above; and, FIG. 2 shows the abovementioned steering wheel in cross-section along the line II—II in FIG. 1.
Figure 2:
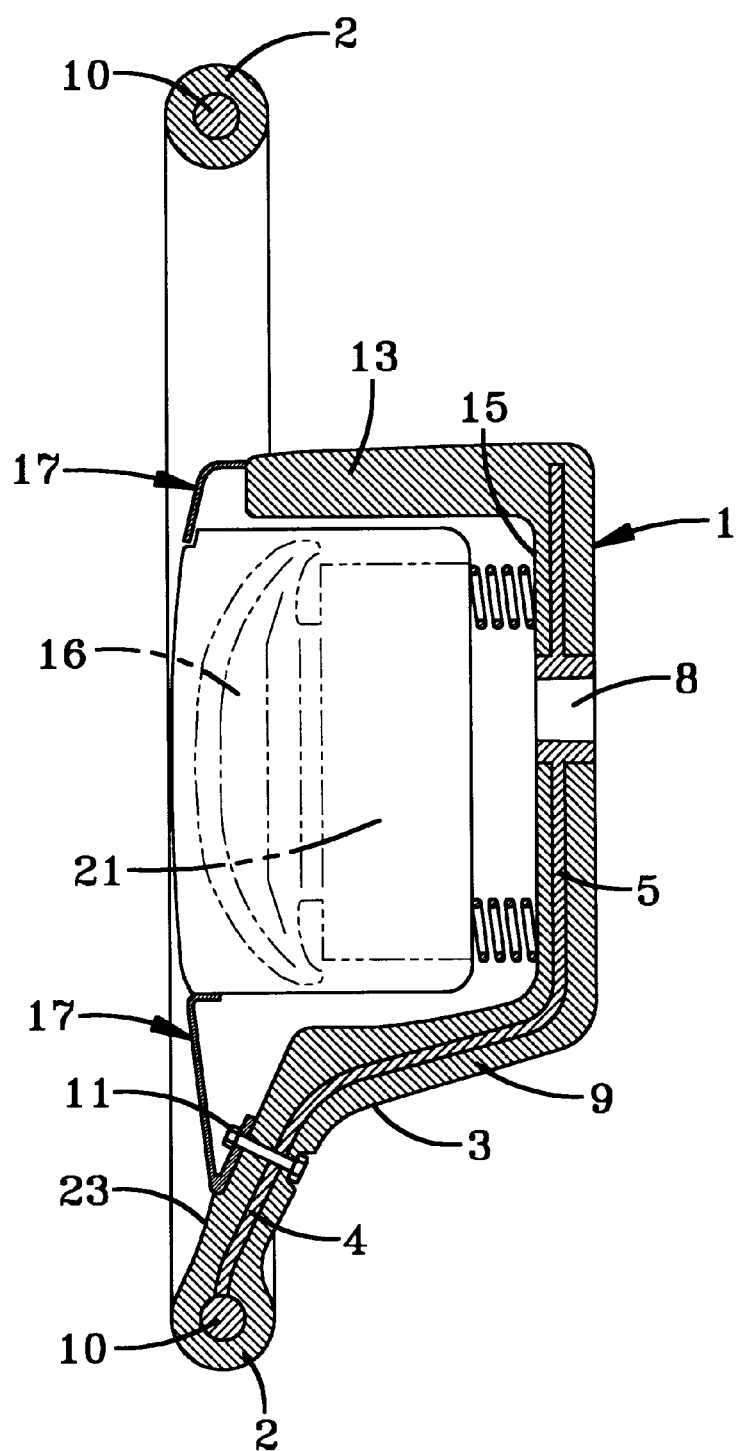

FIGS. 1 and 2 show a steering wheel essentially comprising a central part 1, an outer ring 2 and three substantially radial spokes 3 connecting the central part 1 and the ring 2.

The spokes 3 have internal thin metal cores 4 which branch out from an internal metal core 10 in the ring 2 and are connected together by a metal plate 5 (FIG. 2) which is axially displaced with respect to the ring 2 so as to form a cavity 15 which is used as a space to house a removable module 16 comprising an airbag 21 and a horn.

The plate 5 has a central hole 8 (FIG. 2) for rotational coupling to a corresponding terminal portion of a motor vehicle steering column.

A covering 9 of polyurethane or the like made as a single piece covers the ring 2, the spokes 3 and the plate 5, also forming arched projections 13 laterally bounding the cavity 15.

In order to confer a sporting appearance upon the steering wheel, a peripheral metal part 17 comprising a ring with radial projections fixed over the spokes 3 by means of connection means 11 such as screws or the like, which covers a top surface of the spokes 23 and arched projections 13 is provided and contains and retains the module 16 so as to form a single central unit. The module 16 can perform an axial movement that is necessary for the functioning of the horn.

Many changes and modifications in the above described embodiment of the invention can, of course, be carried out without departing from the scope thereof. Accordingly, that scope is intended to be limited only by the scope of the appended claims.

I claim:

1. A steering wheel provided with an airbag comprising a central part for connection to a steering wheel attachment, having a cavity housing a moveable module capable of axial movement to actuate a horn comprising the airbag, an outer ring a plurality of substantially radial spokes connecting the outer ring to the central part of the steering wheel, and a peripheral metal part around the module fixed to the plurality of spokes by connecting means, the peripheral metal part covering a top surface of the spokes so as to give the steering wheel a sporting appearance.

2. The steering wheel according to claim 1, wherein the peripheral metal part has a circular shape and has radial projections fixed to the plurality of spokes by the connecting means, the peripheral metal part is attached to the module to form a single central unit and to provide the module with the possibility of performing an axial movement.

3. The steering wheel according to claim 2 further comprising arched projections laterally bounding the cavity wherein the peripheral metal part covers the arched projections.

4. The steering wheel according to claim 1 further comprising arched projections laterally bounding the cavity wherein the peripheral metal part covers the arched projections.

5. A steering wheel provided with an airbag comprising a central part for connection to a steering wheel attachment, having a cavity housing a moveable module capable of axial movement to activate a horn and comprising the airbag, an outer ring a plurality of substantially radial spokes connecting the outer ring to the central part of the steering wheel, and a peripheral metal part around the module fixed to the plurality of spokes by connecting means, the peripheral metal part has a circular shape and has radial projections fixed to the plurality of spokes by the connecting means, wherein the peripheral metal part is attached to the module to form a single central unit and to provide the module with the possibility of performing an axial movement.

6. The steering wheel according to claim 5 further comprising arched projections laterally bounding the cavity, wherein the peripheral metal part covers a top surface of the spokes and the arched projections.

* * * * *